United States Patent [19]
Dobbert

[11] 4,071,810
[45] Jan. 31, 1978

[54] SUPPLY CIRCUIT FOR A TELEVISION RECEIVER

[75] Inventor: Gerd Dobbert, Deizisau, Germany

[73] Assignee: International Standard Electric Corporation, New York, N.Y.

[21] Appl. No.: 692,064

[22] Filed: June 2, 1976

[51] Int. Cl.² .................. H01J 29/70; H01J 29/76
[52] U.S. Cl. .................................. 315/400; 315/387; 315/408
[58] Field of Search .............. 315/387, 389, 408, 411, 315/400

[56] References Cited

U.S. PATENT DOCUMENTS

| | | | |
|---|---|---|---|
| 3,452,244 | 6/1969 | Dietz | 315/408 |
| 3,717,789 | 2/1973 | Wolber | 315/370 |
| 3,732,458 | 5/1973 | Wolber | 315/400 |
| 3,825,793 | 7/1974 | Dietz | 315/400 |
| 3,885,198 | 5/1975 | Pritchard et al. | 315/400 |

Primary Examiner—Maynard R. Wilbur
Assistant Examiner—T. M. Blum
Attorney, Agent, or Firm—John T. O'Halloran; Peter C. Van Der Sluys

[57] ABSTRACT

A supply circuit for television receivers in which power source isolation is effected via a backward transformer. For the sake of achieving an insusceptibility to interferences, the operating frequency is equal to the line frequency. According to the invention, the supplied energy is controlled by varying the switch-on time during one period of the line frequency, in that the disconnecting time position is changed with the aid of a thyristor switching stage.

7 Claims, 1 Drawing Figure

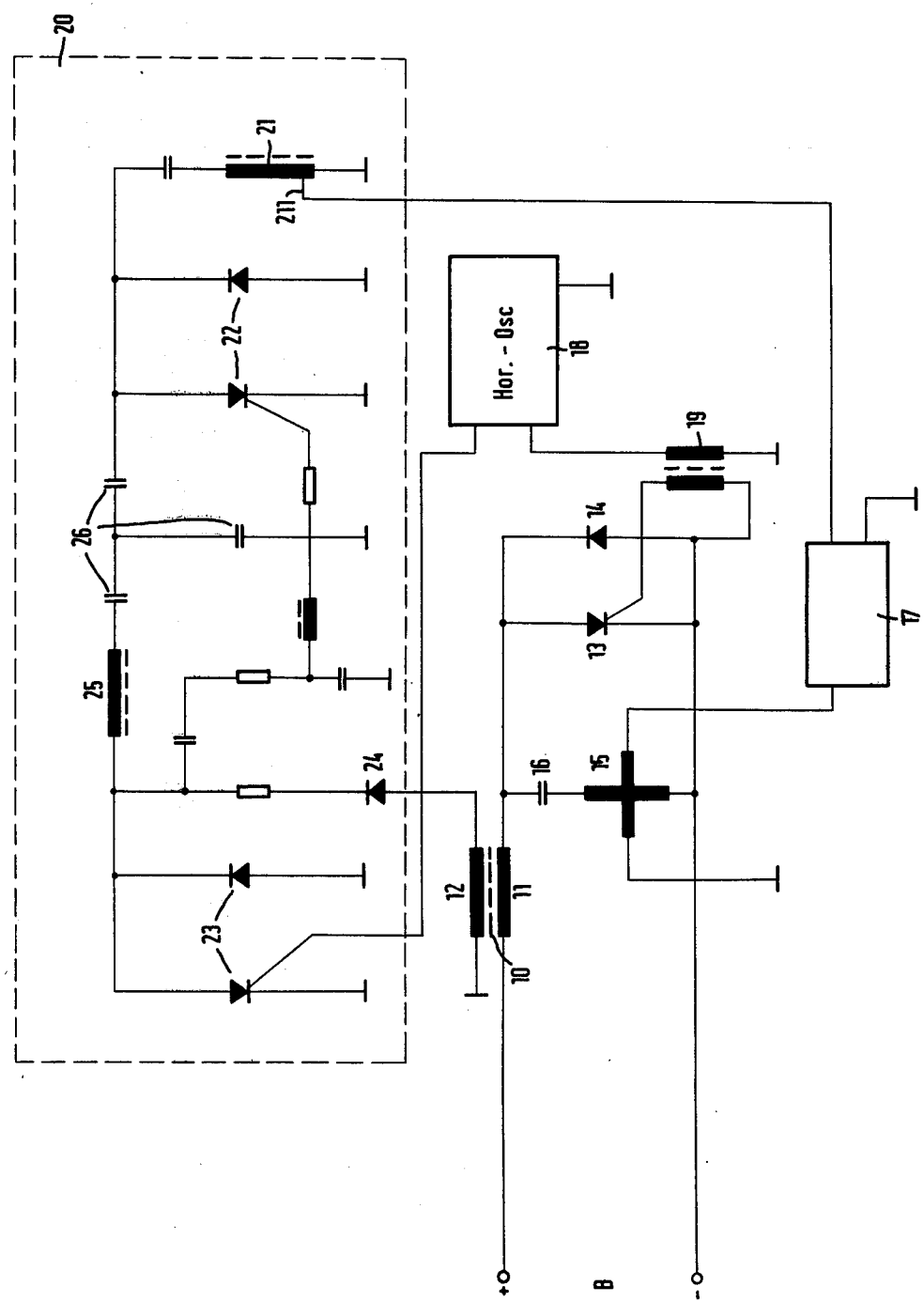

SUPPLY CIRCUIT FOR A TELEVISION RECEIVER

The present invention relates to a supply circuit for a television receiver in which, for effecting isolation of the power source, an input transformer serving the horizontal or line output stage, is operated as a backward transformer and in which, within the horizontal (line) output stage, there are taken off further voltages required for operating the television receiver.

Owing to the various attachments which are capable of being operated in connection with a television receiver, it has increasingly become necessary, for safety reasons, to provide for isolation of the power source the television receiver.

In conventional types of circuits employing backward transformers for effecting the source isolation, it is customary to control the energy supply by way of inserting a transistorized control stage.

The use of transistors in such a circuit part, however, has proved to be problematic owing to the fact that the transistors are sensitive to any case of exceeding the prescribed operational values.

From the German technical journal "Funkschau" 1975, No. 5, page 40 there has already become known a circuit employing a thyristor switching stage for controlling the energy supply. In this circuit, the operating frequency of the thyristor switching stage is dependent upon the operating frequency of the subsequently following horizontal (line) output stage; accordingly, there is concerned a so-called free-running switching stage.

In order to eliminate as far as possible the danger of noise influences as linked thereto, the actually advantageous thyristor switching stage involves a rather considerable investment., It is the object of the invention, therefore, with respect to a circuit of the type mentioned hereinbefore, to avoid the described disadvantages of the conventional arrangments, and to safeguard an operationally reliable control of the supplied energy.

This object is achieved in that the energy as supplied to the horizontal (line) output stage is capable of being controlled by means of a thyristor switching stage arranged in series with the primary winding of the input transformer, with first switching means, in dependence upon the line frequency, switching the thyristor switching stage to the conducting state, and with further switching means serving to block the thyristor switching stage in dependence upon the required energy.

Further details and advantages of the invention may be taken from the patent claims as well as from the following description of the accompanying drawing.

FIG. 1 shows one example of embodiment of the invention.

The horizontal output (final) stage 20 is connected via the input transformer 10 including the primary winding 11 and the secondary winding 12, to the source of supply current B.

As an example relating to the horizontal output (final) stage there is shown in FIG. 1 a thyristor circuit as described in the company publication "Deflection, Power Supply and Correction Circuits for 110° Color Picture Tube A67 - 150x with Toroidal Yoke", No. 59-72-E of Standard Elektrik Lorenz AG, dated Apr. 20, 1972.

By the input transformer 10, the horizontal output stage 20 is galvanically separated from the source of supply current B, i.e. also from the power source. The most important function units of the horizontal output stage will now be mentioned briefly hereinafter.

The reference numeral 21 indicates the schematically shown combined inductive component consisting of deflecting coils and EHT transformer.

The switching stage 22 consisting of a thyristor and of an anti-parallel connected diode, represents the stage controlling the line sweep while the similarly designed switching stage 23 is the so-called commutating switch.

Between these two switching stages there is connected the commutating inductive component 25 and the commutating capacitor consisting of a capacitor combination 26.

The electrical energy as required in the deflection circuit and the remaining circuit parts not shown herein, and connected to the horizontal output stage 20, is fed to this horizontal output (final) stage 20 in the way according to the invention to be explained hereinafter.

The primary circuit of the inductive component 10 designed as an input transformer, is connected to the supply source B, at the "plus" and "minus" terminals of which the rectified power source voltage is available. The input transformer 10 comprises the primary winding 11 and the secondary winding 12. In series with the primary winding 11 there is arranged a thyristor switching stage consisting of a thyristor 13 and of a diode 14, with both the thyristor and the diode being connected antiparallel.

The thyristor 13 is controlled in this case by inserting an isolating transformer 19, by the horizontal oscillator 18, which means to imply that the operating frequency of the supply circuit including the input transformer 10 is identical to that of the horizontal final stage 20.

The switch-on time position, i.e. the one at which the thyristor 13 is switched to the conducting state, is determined by the control pulse from the horizontal oscillator 18.

Disconnection of the thyristor 13 or switching to the non-conducting state, is effected in the usual way by a current reversal during the time interval in which e.g. the commutating switch 23 is blocked. This is effected by the series resonant circuit arranged in parallel with the thyristor switching stage, including the capacitor 16 and the inductive component 15, in cooperation with the diode 14. This disconnecting time position or the time position at which the thyristor 13 is switched to the non-conducting state, is determined by the resonant frequency of the series-resonant circuit. Accordingly, at a constant switch-on time position, it is possible to determine the period of time during which the thyristor 13 is switched to the conducting state, by varying the resonant frequency and, consequently, by shifting the time position at which the thyristor 13 is switched to the non-conducting state. The period of time during which the thyristor 13 is switched to the conducting state, and, consequently, the period of time of the current flow, however, are decisive for the amount of energy capable of being taken off the input transformer 10 or the secondary winding 12 respectively.

The aforementioned variation of the resonant frequency of the series-resonant circuit, may be carried out, on principle, by a capacitance variation of the capacitor 16, as well as by changing the inductance 15, or else by both.

In the shown example of embodiment there has been chosen a variation of the inductance, in which case, as an inductive component, a transductor is inserted in such a way that its operating winding is in series with the capacitor 16. Transductor 15 provides an inductance that varies in accordance with a DC signal applied thereto. If now, in accordance with stipulations, the energy supply is to be controlled in dependence upon the energy requirement, a corresponding control circuit will have to be provided for.

The energy consumed in the horizontal final stage can be measured by the value of the voltage of the kick-back pulse at the EHT transformer. In order to obtain this value, a tap 211 is schematically shown at the inductive component 21 of the horizontal final stage 20. This tap is connected to a control circuit 17.

As already mentioned, a transductor 15 is used as the adjustable inductive component of the series resonant circuit, whose inductance is capable of being varied by varying the current or voltage as applied to the control winding. At the same time, the transductor effects a galvanic separation. The control circuit 17 into the output circuit of which, according to FIG. 1, there is connected the control winding of the transductor 15, thus serves to convert the value of the voltage of the kickback pulse available as the input or control quantity, into a corresponding value for adjusting the inductive component 15.

Control circuits, such as e.g. 17, are on principle generally known to those skilled in the art and, therefore, do not need to be explained in detail herein, especially since the circuit-technical embodiment thereof is not germane to the present invention. An example of a control circuit that may be used for circuit 17 is shown in the publication previously referred to and entitled: "Deflection, Power Supply and Correction Circuits for 110° Color Picture Tube A67 - 150x with Toroidal Yoke".

It should still be mentioned that the input transformer 10 is operated as a backward transformer comprising a correspondingly polarized diode 24 in the secondary circuit, which is of advantage for reasons of dimensioning the input transformer 10.

What is claimed is:

1. A supply circuit for a television receiver having a horizontal output stage including means for controlling line sweep and commutation, the energy required by said horizontal output stage being provided by a power source through a controllable supply circuit that isolates the power source from the horizontal output stage, said controllable supply circuit comprising:

an input transformer having a secondary winding connected to the horizontal output stage for providing the energy required thereby and a primary winding adapted for connection to the power source and being electrically isolated from the secondary winding and the horizontal output stage;

electronic switch means connected in series with the primary winding of the transformer;

first switching control means for switching on the electronic switch means as a function of line frequency; and second switching control means for switching off the electronic switch means as a function of the energy required by the horizontal output stage, whereby the supply circuit provides the horizontal output stage with the required energy from the power source while also electrically isolating the horizontal output stage from the power source.

2. A supply circuit as described in claim 1, wherein the electronic switch means comprises a thyristor stage.

3. A supply circuit as described in claim 1, wherein the thyristor stage comprises a thyristor and a diode connected in inverse parallel manner, the gate electrode of the thyristor being connected to the first switching control means for turning on the thyristor.

4. A supply circuit as described in claim 3, wherein the first switching control means includes a horizontal deflection oscillator.

5. A supply circuit as described in claim 4, additionally comprising an isolation transformer connected between the thyristor gate and the horizontal deflection oscillator.

6. A supply circuit as described in claim 2, wherein the second switching control means comprises a series resonant circuit having an adjustable resonant frequency, said circuit being connected in parallel with the thyristor stage for causing commutation of the current in the thyristor stage.

7. A supply circuit as described in claim 6, wherein the series resonant circuit includes a transductor having a control winding, and the second switching control means additionally comprises a control circuit adapted to receive a signal from a high voltage transformer of the horizontal output stage and to provide in response thereto an output signal to the control winding of the transductor, said output signal varying in accordance with the signal from the high voltage transformer for varying the inductance of the transductor.

* * * * *